United States Patent

Beavers

[15] 3,648,867
[45] Mar. 14, 1972

[54] SPARE TIRE CARRIER

[72] Inventor: J. W. Beavers, Route 4, Box 272, Duncan, Okla. 73533

[22] Filed: Aug. 28, 1970

[21] Appl. No.: 67,835

[52] U.S. Cl. ............................................. 214/454, 214/453
[51] Int. Cl. ....................................................... B62d 43/00
[58] Field of Search ........................... 214/451, 452, 453, 454

[56] References Cited

UNITED STATES PATENTS

| | | | |
|---|---|---|---|
| 3,330,431 | 7/1967 | Knecht | 214/454 |
| 2,777,591 | 1/1957 | Manzatuik | 214/451 |
| 3,494,493 | 2/1970 | Fowler | 214/454 |

Primary Examiner—Gerald M. Forlenza
Assistant Examiner—John Mannix
Attorney—Earl Babcock

[57] ABSTRACT

A spare tire carrier for motor vehicles and the like in which the spare tire is secured to an extensible tubular telescoping section, one end of which is swiveled to the frame of the vehicle under the floor thereof and the other end of which is provided with a handle, together with means whereby the handle may be lifted by manually operable mechanism to clamp the tire tightly against the floor of the vehicle. The telescoping section has points of suspension on the frame well above the center of gravity of the tire so as to serve as a cradle tending to hold the tire in a horizontal position while the section is being collapsed or extended. The manually operable means includes an eccentric for gaining a mechanical advantage and is so designed as to pass slightly beyond dead center so as to use the weight of the tire to hold it in locked position when the tire is clamped. The carrier is adjustable vertically to accommodate various size tires.

4 Claims, 5 Drawing Figures

PATENTED MAR 14 1972 3,648,867

INVENTOR.
J W BEAVERS

BY Earl Babcock.

ATTORNEY

SPARE TIRE CARRIER

This invention relates to a carrier for spare tires and spare wheels which permits them to be clamped beneath the floor of the vehicles upon which they may be used but withdrawn for ready access when a change has to be made.

The mounting of spare tires under vehicles is common practice, especially such vehicles as trucks and trailers. They then take up no load space. A difficulty arises, however, when it is necessary to withdraw them for use on the vehicle. Several attempts have been made to provide mechanisms for withdrawing the spare tires from beneath the body of such vehicles for ready access so that the operator need not crawl under to release clamps, bolts or the like. Among U.S. patents in this art may be mentioned the following: U.S. Pat. Nos. 3,012,685; 3,323,667; 3,369,683; 3,435,971; and 3,494,493.

It is an object of the present invention to accomplish the purposes mentioned, as well as others as will appear hereinafter, by a very simple and compact carrier.

Many changes can be made in the arrangement and construction of parts without departing from the spirit of this invention, but only the preferred embodiment will be shown and described herein. Referring to the drawing, FIG. 1 is a view in side elevation, partly cut away, and partly truncated, of a tire carrier built in accordance with the invention;

Figure 1:
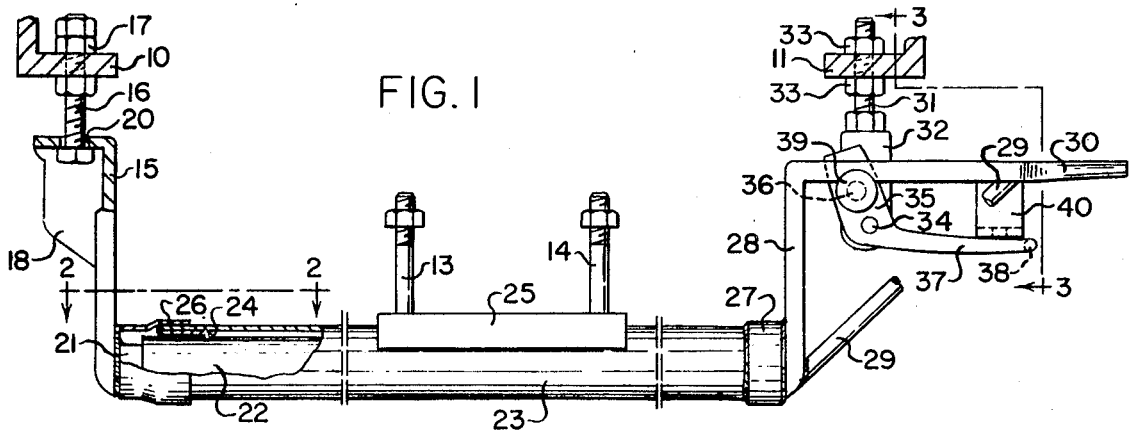
Figures 2, 5:
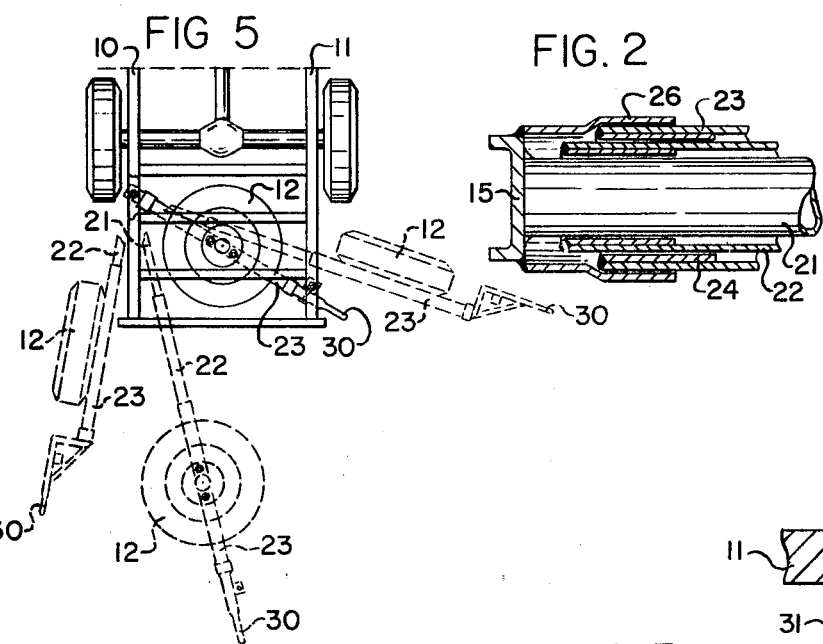
FIG. 2 is a cross-sectional view of the portion of the device of FIG. 1, taken on the line 2—2 of FIG. 1, and showing how the tubes of the telescoping section are nested together.
Figure 4:
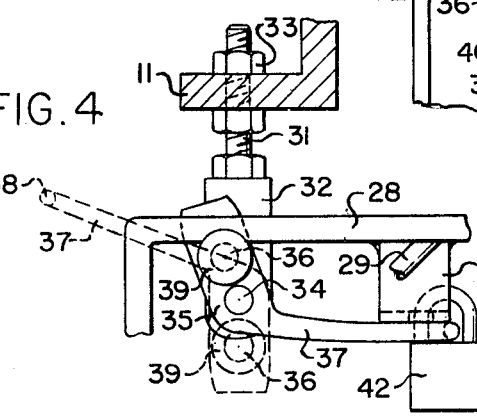

FIG. 4 is a view in front side elevation, the same as the view in FIG. 1, but limited to an illustration of the locking mechanism, and showing, in dotted lines, the position of the eccentric when the telescoping section is being loaded upon it; and, FIG. 5 is a diagram roughly illustrating a portion of the body of a pick-up truck, as a plan view with the floor removed, and showing how the spare tire is mounted with the carrier of the present invention, the dotted lines showing how the spare tire may be brought out from under the truck and moved to various positions.

Referring to the drawing, it will be seen that two beams 10 and 11 are shown in cross section in FIG. 1. These are intended to represent the two parallel beams 10 and 11 of the ordinary pick-up truck of FIG. 5. It will be assumed that the carrier of the present invention is to be swivelled to the left hand beam 10 and locked to the right hand beam 11 when the tire is in place as shown in full lines in FIG. 5. Of course, these positions may be reversed.

The spare tire is designated 12 in FIG. 5. It can be secured to the carrier by two stud bolts 13 and 14 shown in FIG. 1.

The carrier consists, essentially, of three parts. There is a depending bracket 15 connected to the beam 10 by the bolt 16. Nuts 17 permit vertical adjustment of the bracket 15 with respect to the frame of the vehicle so that tires of different sizes may be accommodated by the carrier. The horizontal portion of the bracket 15 is reenforced by the gusset 18.

It will be noticed that the slot 20 in the horizontal portion of the bracket 15 is longer than the diameter of the bolt 16. Thus, the bracket 15 may swing to the right or left slightly, as viewed in FIG. 1, and it may also turn freely horizontally, as shown in FIG. 5. Because of this arrangement, the bracket 15 is referred to herein as a swivel bracket. It is mounted on the vehicle at a point spaced some distance from the rear.

Secondly, the carrier of the present invention includes a tubular telescoping section. This consists of three tubes designated 21, 22, and 23 of different diameter and all of circular cross section. These are nested together and provided with stops 24 to keep them from coming completely apart, but permitting them to be collapsed or extended. These tubes are freely rotatable one within another.

As shown in FIG. 1 and FIG. 2, the inner tube 21 is welded or otherwise rigidly secured to the swivel bracket 15. Thus, the entire tubular telescoping section may be swung horizontally under the vehicle, and the right hand end, as viewed in FIG. 1, may be raised up and down.

The outer tube 23 is the one which carries the stud bolts 13 and 14 for securing the spare tire to the carrier. It may be provided with a platform 25 to steady the tire. The swivel bracket 15 may have a dust cap 26 thereon to protect the tube 23 when the tubes are completely nested together.

The intermediate tube 22 may be said to be floating. That is, it is not connected to anything else, and serves merely to shorten or lengthen the distance from one end of the section to the other as it is collapsed or extended.

The third essential element of the carrier of the present invention is the mechanism for fastening the tubular section to the vehicle and locking it in place with the spare tire clamped under the floor.

At the right hand end of the tubular section, there is a cap 27 welded or otherwise rigidly secured to the outer tube 23. On this cap there is welded a channel iron 28 bent at a right angle and extended further to the right as shown in FIG. 1. A brace rod 29, partly cut away as viewed in FIG. 1, strengthens this channel iron. The right hand end of this channel iron 28 is reduced into a round extension 30 to form a handle.

The handle 30 may thus be used by the operator of the carrier to pull the tubular section out from under the vehicle and bring it to any suitable position, as shown in dotted lines in FIG. 5. In doing so, the operator may rotate the tubes so as to move the tire to a vertical position as illustrated on the left and right hand sides of the vehicle in FIG. 5. Indeed, the tire may be turned upside down, if desired.

With the tire mounted on the tube 23 as indicated above, its center of gravity is above the centerline of the tubular section. The natural tendency, therefore, is for it to tend to fall out of the horizontal position on the tube 23 as the tubular section is collapsed or extended. It will not tend to do this with the arrangement shown, however, because the handle 30 is above the center of gravity of the tire. The arrangement thus serves as a cradle for the tire tending to hold it horizontal while the carrier is being manipulated.

Figure 3:
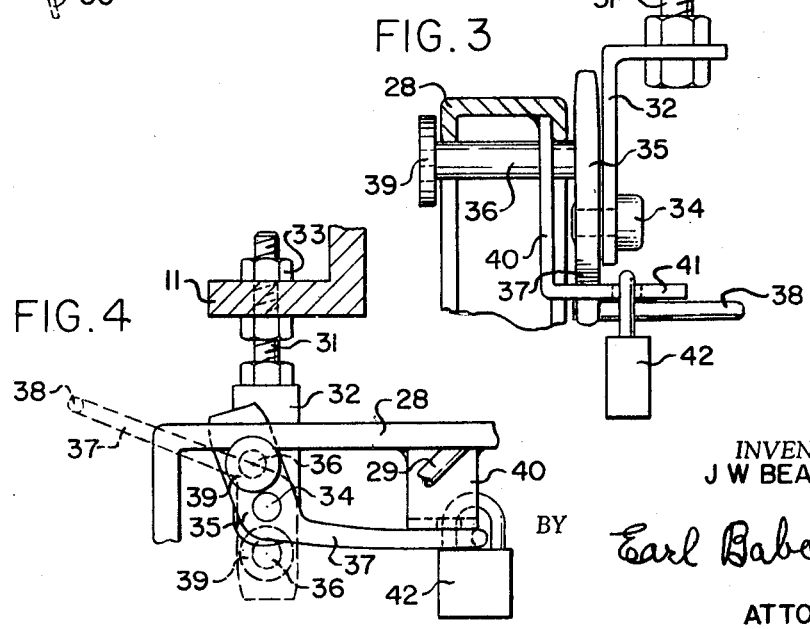
FIG. 3 is a view in side elevation of the locking mechanism of the device of FIG. 1 as viewed from the right of FIG. 1 on the line 3—3 thereof.

For cooperating with the channel iron 28 and the handle 30, latching and locking mechanism is mounted on the beam 11 of the vehicle. Details of this mechanism are shown in FIGS. 1, 3, and 4.

There is a bolt 31 connecting a latching bracket 32 to the beam 11. This latching bracket is near the rear end of the vehicle in the arrangement shown, so as to be readily accessible to the operator. Unlike the swivel bracket 15, this latching bracket 32 is not loosely mounted. It is fixed to the frame of the vehicle, but is adjustable vertically by the nuts 33 so as to accommodate tires of different sizes.

By mean of a pivot bolt, designated 34, a crank is mounted on the bracket 32. This crane consists of an off-set portion or eccentric 35 which carries a projecting post or cam 36. As shown in FIG. 1 and in full lines in FIG. 4, there is an arm 37 integral with the bottom of the eccentric, and this arm is provided with a handle 38. The cam 36 is a little longer than the width of the channel iron 28 and is provided with a flange 39 as shown in FIG. 3.

The tubular section of the carrier is of such length when collapsed as to span the distance from the bracket 15 to the bracket 32. When the tubular section is extended, as shown in dotted lines in FIG. 5, the spare tire 12 may be brought out to a point well beyond the area defined by the floor of the vehicle.

In operation, let it be assumed that the carrier is in extended position behind the vehicle and that the spare tire 12 is secured to the bolts 13 and 14. It is desired to collapse the carrier. This can be done by grasping the handle 30 and forcing it inwardly. Then, when fully collapsed, the handle 30 is lifted and the carrier swung over until the channel iron 28 can be set upon the cam post 36 as shown in FIG. 3. Because the handle 30 and the horizontal portion of the channel iron 28 are off-set vertically above the center of gravity, as explained above, the assembly hangs naturally with the tire horizontal under the vehicle.

When the channel iron 28 is first set upon the cam 36, the crank is in the dotted line position shown in FIG. 4. That is, the cam 36 is hanging down below the pivot bolt 34. By grasping the crank handle 38 and rotating the crank counter-clockwise, as viewed in FIG. 4, the cam 36 raises the channel iron 28 and hence the tubular section carrying the tire. Thus, there in manually operable means for clamping the tire against the underside of the vehicle. There is enough flexibility in the tire to permit some variation in the amount of force necessary to clamp the tire securely in place.

One feature of the present invention resides in the fact that the crank can be rotated until the eccentric goes slightly beyond dead center. This is shown somewhat exaggerated in FIGS. 1 and 4. This construction causes the weight of the tire to serve as means tending to hold the carrier in locked position, although the main purpose of the crank, with its eccentric 35 and cam 36 is, of course, to gain a mechanical advantage in lifting the carrier.

In the accompanying claims, the word, "Latch" is intended to convey the idea of —fastening—. Thus, whether the eccentric 35 went beyond dead center or not, the crank would serve as latching means. With the construction shown, the crank serves to "lock" the carrier to the vehicle. This is because of the fact that the eccentric goes beyond dead center, and the use of the word, "lock" in the claims has nothing to do with the additional mechanism now to be described.

A depending lug 40 is welded to the horizontal part of the channel iron 28 and this has a lateral extension 41 which serves as a stop for the counter-clockwise motion of the crank. There is a hole in this lateral extension 41 and the handle 38 of the crank may be padlocked to the lug 40 and thus held firmly in locked position. A padlock is shown at 42.

I claim:

1. A spare tire carrier for vehicles including, in combination, a swivel bracket and a fixed bracket adapted to be mounted on the frame of the vehicle in spaced position under the floor thereof, and a telescoping section having an inner and an outer tube and spanning, when in collapsed position, the distance from one bracket to the other, but spanning, when in extended position, the distance from the swivel bracket to a point well outside the area defined by the floor of the vehicle, means connecting the inner tube to said swivel bracket, latching means on said fixed bracket for fastening the outer tube thereto, and means for securing a spare tire to said outer tube, whereby the tire may be clamped in a horizontal position against the floor of the vehicle when the section is in collapsed position, but be capable of being brought out from beneath the vehicle and rotated to a vertical position when the outer tube is unlatched and the section extended as the outer tube is rotated upon the inner tube.

2. The device defined in claim 1 in which the outer tube is provided with a handle offset vertically above the centerline of said section, whereby the carrier serves as a cradle tending to hold the tire in horizontal position while it is being mounted under the vehicle.

3. The device defined in claim 1 in which the outer tube is provided with a handle and in which the latching means includes an eccentric capable of being manually operated to gain a mechanical advantage in lifting the handle to clamp the tire.

4. The device defined in claim 3 in which the latching means is so designed that the eccentric passes slightly beyond dead center !hen the tire is clamped to the floor of the vehicle thereby causing the weight of the tire to exert a downward force upon the latching means to lock the carrier and tire in place.

* * * * *